(12) United States Patent
Nikami et al.

(10) Patent No.: US 7,587,505 B2
(45) Date of Patent: Sep. 8, 2009

(54) DATA COMMUNICATION METHOD, DATA COMMUNICATION SYSTEM, AND PROGRAM

(75) Inventors: Tetsuya Nikami, Chiba (JP); Tatsuyuki Matsumoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 10/170,336

(22) Filed: Jun. 12, 2002

(65) Prior Publication Data

US 2003/0126306 A1    Jul. 3, 2003

(30) Foreign Application Priority Data

Jul. 6, 2001    (JP)    ............................. 2001-206983

(51) Int. Cl.
*G06F 15/16*    (2006.01)

(52) U.S. Cl. ...................................... 709/230; 709/246

(58) Field of Classification Search ................ 709/230, 709/246, 249, 203, 216–219

See application file for complete search history.

(56) References Cited

U.S. PATENT DOCUMENTS

| | | | | |
|---|---|---|---|---|
| 5,687,373 A | * | 11/1997 | Holmes et al. .............. | 719/328 |
| 5,822,520 A | * | 10/1998 | Parker ......................... | 709/230 |
| 6,356,933 B2 | * | 3/2002 | Mitchell et al. ............. | 709/203 |
| 6,658,625 B1 | * | 12/2003 | Allen .......................... | 715/523 |
| 2002/0124113 A1 | * | 9/2002 | Gargya et al. ............... | 709/246 |

FOREIGN PATENT DOCUMENTS

| JP | PUPA H07-281974 | 10/1995 |
|---|---|---|
| JP | PUPA H10-083308 | 3/1998 |
| JP | PUPA 2000-242587 | 9/2000 |
| JP | PUPA 2000-354053 | 12/2000 |

* cited by examiner

*Primary Examiner*—John B. Walsh
(74) *Attorney, Agent, or Firm*—Ronald Kaschak; Hoffman Warnick LLC

(57) ABSTRACT

A method and system to enable communications between components using a single procedure so that a user is not required to consider compatibility among protocols when programming or maintaining programs. A data communication class which enables communications regardless of matching among protocols, a data communication interface, and an implementation class for each protocol are prepared so as to operate or develop an application program. The data communication class is initialized in the application program and a communication interface calls a communication method from its instances. The communication data is passed as an argument of the communication method. When a data communication instance is generated, the implementation class corresponding to a protocol specified for the property is set in the instance.

18 Claims, 3 Drawing Sheets

DATA COMMUNICATION METHOD, DATA COMMUNICATION SYSTEM, AND PROGRAM

FIELD OF THE INVENTION

The present invention relates to a data communication method, a data communication system, and a program. More particularly, the present invention relates to a technique employable effectively for message (data) communications between distributed components.

BACKGROUND

Object-oriented programming is now widely used to provide efficient development/maintenance of computer programs. In the case of object-oriented programming, program components are created from a group of objects (classes) and those components are combined for component-based system development so that a predetermined task (processing) is realized. For example, in the case of a component (Java Bean) that uses Java Beans, which is a Java component creating technique, the component, when receiving an event, executes a communication method so as to update the component property or call a communication method from a different component (or instance) so as to issue an event to the different component. The operations (methods) of those components are combined so as to realize a complicated task. It is premised here that those components can exchange messages (information or data) with other components.

Components exist in one and the same hardware system in some cases and they exist in a LAN (Local Area Network) and/or a network connected via the Internet in other cases. Consequently, each of distributed components requires a protocol used for data communications in the network. For example, the HTTP (HyperText Transfer Protocol), which is a standard communication protocol of the Internet, can be used among the components connected to each other via the Internet. When higher reliability is required for data communications, the distributed object standard IIOP (Internet Inter-ORB Protocol) employed for the CORBA (Common Object Request Broker Architecture) can be used. When in asynchronous communications, MQ (Message Queuing) can be used. For communication between a host computer and each terminal, SNA (Systems Network Architecture) can be used. When JVM (Java Virtual Machine) is operating, the RMI (Remote Method Invocation) library can be used. And, because RMI also corresponds to the IIOP in Java 2, the RMI over IIOP can be used. Java, Java Beans, and Java 2, described above are all the trademarks of Sun Microsystems Corporation. Windows, Unix, C, and C++, to be described below are trademarks of corporations and groups that hold them.

A component-based system can execute a variety of processings. Examples of such processings are ERP (Enterprise Resource Planning) for basic business activities in corporations, such as production/inventory control, financial accounting control, and personnel/wage payment, as well as those of data base management systems, and web servers. Generally, an intra-net operated in a corporation must be designed so as to assure high communication reliability. In addition, such an intra-net requires a system to be built so as to cope with mission critical processings that must be executed as fast as possible. On the other hand, a web application program is hardly used for tasks that compete with others in units of one second. A system employed for such a web application program can thus be built with not-so-high communication reliability. Consequently, when such a system is to be built, a protocol to be employed for the communication among components depends on the system requirement or the characteristic of the processings executed by those components. For example, IIOP should preferably be employed for a system used for mission critical processings in a corporation from the viewpoints of connection reliability, easiness of error locating/investigation, security, transaction context transfer possibility, and performance level. For a web application program, therefore, it would be proper to employ HTTP, which is an actual standard protocol for web application programs. HTTP may also be used easily for building firewalls. The MQ should preferably be employed for the communication with asynchronous systems.

Each of those protocols also has disadvantages. For example, IIOP fixes the communication interface for application programs (components) that use the IIOP. Consequently, when any part of the data specifications is modified, for example when a communication data attribute is newly added to the interface, the interface must also be modified so as to meet the modification. In other words, the assurance of HTTP in communication reliability is lower than that of the IIOP. In addition, the HTTP cannot follow up detected errors easily. Basically, HTTP just specifies transfer of character strings, so that HTTP cannot assure communication reliability for binary data. To transfer binary data by HTTP, therefore, data must be encoded to a character set before it is transferred. The load of the server thus increases due to such encoding/decoding of binary data before the transfer and accordingly, the processing time also increases due to the increased load. This is why it is difficult to apply HTTP for mission critical processings.

As described above, each of the protocols has both advantages and disadvantages. The system developer must thus consider both advantages and disadvantages so as to select a protocol used for building a system. On the other hand, when one application (component) program uses a plurality of protocols, the program communication part (interface) must be created appropriately to each protocol. This means that the programmer must be aware of the subject protocol when creating a program for sending/receiving data. When programmers are required to consider the communication protocol in addition to the component functions, degradation of the system development efficiency will result.

IIOP is effective when employed for a system that is attracting a great deal of attention and being used for transactions (B2B) among corporations via the Internet in recent years, as IIOP provides both high communication reliability and high performance. For B2B transactions, however, existing corporation systems must be connected to each other via the Internet. For B2C transactions (transactions between a corporation and its customers), each corporation can present each customer who accesses the server with a data input screen defined uniquely, so that the corporation can decide the data format independently of others. For B2B transactions, however, most of the connected corporation systems are already built, so that consideration must be given to matching among the data formats of connected corporations. For example, it is required to prepare the middleware used for transferring data, as well as coping with changes of the data formats of the connected corporations. Under such circumstances, the following problem will arise when IIOP is employed with no modification for B2B transactions among corporations. While IIOP has the above-described advantages, the communication interface is fixed for application programs that use the IIOP. Consequently, when such modification as addition of a data attribute, and so forth is done in a connected communication system, the interface must also be modified so as to meet the modification. When part of a data specification is modified so as not to affect any component that uses the interface directly while other components (or class) use this interface, the components are affected by the interface modification; consequently, they are typically updated by recompiling. When many components use the interface, the work load for coping with such modification of data specifications increases significantly. Such interface modification is also required in protocols other than IIOP. In such a case, the problem as described above will also arise, of course.

Furthermore, when both communication interface and communication data are generalized, the communication interface technique and the communication data structure of the present invention are required to endure use on a practical level. Especially, the communication interface technique and the communication data structure are required to meet high level responses needed for mission critical processings to be expected in transactions in each corporation or among corporations.

SUMMARY

A data communication method of the present invention employed among components includes a step of receiving a property and communication data and a step of communicating the data in accordance with a protocol specified for the property. This means that the present invention prepares an interface program that enables data communications independently of protocols while an application program is operating or under development. This data communication interface program is provided as, for example, a series of programs including a data communication class program and an interface program. This program executes the function of a communication interface for initializing a data communication class (generating an instance) in an application program and calling a communication method from the instance. The communication data can be passed to the communication program as an argument of the communication method. In addition, the present invention generates a communication implementation class prepared for each protocol as an instance when, for example, a communication class instance is generated (initialized). The communication implementation class is described each communication protocol as a communication method beforehand. A communication implementation class to be generated as an instance can be selected in accordance with a protocol identified by a property argument passed at the initialization time. Specifically, because a communication implementation class corresponding to a specified protocol is generated as an instance, it is possible to realize data communication in accordance with a protocol only by calling the communication method from the communication instance.

In this way, the communication interface program of the present invention can eliminate differences of program description formats among protocols due to an instance generated in accordance with each protocol. Consequently, data communication on the application level is enabled without being aware of the program description format that differs among protocols. Data communication with a target component (the other end of communication) is enabled by initializing the communication class (interface program), generating an instance with specification of a protocol and calling the communication method from the instance. The communication data is passed as an argument of the communication method, so that programmers are not required to be aware of the description format, which differs among protocols. In addition, the programmers can select an employable protocol easily due to the property specification when in the instance generation, thereby being enabled to select an optimal protocol from among various protocols in accordance with the circumstances. Consequently, programmers can concentrate on the development of the subject application program used to realize the desired functions; thereby the efficiency of development and maintenance of programs can be improved. The result (return value) of the communication method calling is received by substituting it for a proper variable.

Furthermore, the present invention uses communication data consisting of character strings described in an XML format (Extensible Markup Language) or a combination of binary data and XML-formatted character strings. Communication data is generalized with use of XML-formatted character strings. The present invention also enables communication data to accommodate changes of data specifications more readily because of the structure of the data elements. In addition, the XML enables each data element to be defined specifically with use of tags. Consequently, it is possible to refer to only necessary data in an application program and process data flexibly, for example, skipping non-related data (elements) during reading. Consequently, each application program can cope with changes of data specifications easily and prevent the communication interface from being affected by those changes. There is no need to modify the interface program even when part of data specification is changed, so that there is no need to make such reconfigurations as recompiling even when a plurality of components use the interface. More concretely, even when any part of a data specification is modified, only the application program that uses the data needs to be modified; there is no need to modify every component of the system.

Furthermore, the present invention requires each receiving component of encoding/decoding binary data to/from a character string, and so forth, since communication data includes such binary data. Consequently, the present invention can reduce communication overhead. When communication data includes binary data, it is usually required to identify both starting and ending positions of the data. This binary data delimiting information can be communicated as XML-formatted character strings as described above. An XML-formatted character string for denoting a position of binary data can be generated in a step of generating an element position character string consisting of a character string for denoting a starting position of an element in binary data, a separator such as a comma, and a character string for denoting a terminating position of the element in the binary data, as well as a step of enclosing the element position character string with an element tag and its terminating tag of the element.

According to the present invention, when the XML is used as a communication data structure, overhead reducing means is used.

When array data is included in communication data, the data communication method of the present invention can include a step of delimiting each element of the array data with a separator such as a comma so as to generate an array data character string consisting of the elements of array data and separators and a step of enclosing the array data character string with an array tag and its terminating tag so as to generate an XML-formatted character string. When map data is included in communication data, the method can include a step of connecting each of the elements of map data to mapping data mapped in the element with an equal character or any other defined connection character so as to generate an element/data character string consisting of elements, connection characters, and mapping data; a step of delimiting an element/data character string of each element with a separator such as a comma so as to generate a map data character string consisting of element/data character strings and commas/separators; and a step of enclosing each map data character string with a map tag and its terminating tag so as to generate an XML-formatted character string. For example, in the case of a protocol used for the RPC (Remote Procedure Call) communication in such an XML format as the SOAP (Simple Object Access Protocol), it is defined that data is sent/received by attaching a tag to each element of the subject document. When each element is tagged while the subject data consists of many elements of the same type such as array or map data, the overhead increases. Such a data structure can be described simply without degrading the reading and structuring properties of the XML, and thereby the number of tags to be attached can be reduced significantly. Consequently, it is possible to reduce the number of characters in each XML character string, thereby reducing the communication overhead. When the number of tags is reduced in this way, it is also possible to reduce the overhead caused by the validity check by an XML processor/parser. The reduction of the overhead makes it possible to provide practical communication means.

Furthermore, the present invention includes a specific parser used to generate simplified XML character strings. The parser uses a communication method that includes a step of receiving communication data and an index character string for indexing the communication data; a step of enclosing communication data or its attribute data with a starting tag including an index character string and its terminating tag so as to generate an XML-formatted character string; and a step of repeating the processings in the above steps for different communication data so as to generate a second XML-formatted character string of the different communication data and add the second character string to the above character string. According to the method, it is impossible to create an XML document with a nesting structure that enables an element to exist in another element. Consequently, although both universality and flexibility of the XML document are degraded slightly, processing speed is increased, especially for processing that requires a validity check for the data. When XML character strings are used as communication data, it is not required so much to use a nesting structure as to represent data. On the other hand, the use of XML character strings will have a significant advantage that makes it possible to reduce the overhead caused by the validity check and realize fast communications in some cases. The parser of the present invention is effective for such cases. The validity check is very important to check data received from unreliable/unknown users. Especially, the validity check is effective when applied to an application program that causes data to be received from an unspecified number of users. Of course, this validity check can be omitted in communication with reliable users so as to speed up the communication.

When the above-described simplified parser is used and communication data includes array or map data, the number of tags can be reduced by simplifying the data structure as described above, of course. When communication data includes binary data, the simplified parser can also handle the data just like in the above case.

The present invention can use the following protocols: CORBA/IIOP, RMI over IIOP, HTTP, Message Queuing (MQ), and SOAP. The present invention can also use other protocols as long as they can be implemented in the above-described communication interface program (class), of course.

DESCRIPTION OF SYMBOLS 1a, 1b ... System
2a, 2b ... Application Program
3a, 3b ... Data Communication Program
4a, 4b ... Interface Program
5a to 9a, 5b to 9b ... Implementation Program
10 ... Communication Line
11 ... Communication Data
12 ... Data Communication Program Package
13 ... Data Communication Class
14 ... Data Communication Interface
15 ... CORBA Implementation Class
16 ... EJB Implementation Class
17 ... MQ Implementation Class
18 ... HTTP Implementation Class
19 ... Data Communication Interface
20 to 24 ... Communication Method
25 ... Data Communication Interface
26 ... Data Communication Interface
27 ... Implementation Instance
28 ... Communication Method

DETAILED DESCRIPTION

Hereunder, preferred embodiments of the present invention will be described in detail with reference to the accompanying drawings. However, note that changes and variations may be made without departing from the spirit or scope of the present invention. The same reference numbers will be used for the same elements throughout the preferred description of embodiments of the present invention.

Both methods and systems according to the invention to be described below may be provided as a computer usable program. Consequently, the present invention may be taken as a hardware embodiment, a software embodiment, or a combined embodiment of software and hardware. The program may be recorded on a hard disk, CD-ROM, or any computer readable medium of an optical recording apparatus, magnetic recording apparatus, or the like.

Furthermore, in the following embodiments, a general computer system may be used as the system, which is provided with hardware resources such as a central processing unit (CPU); a main memory (RAM); a non-volatile recording apparatus (ROM); a coprocessor; an image accelerator; a cache memory; and an I/O controller (I/O). The computer system is also provided with external storage units such as a hard disk drive, as well as communication means connectable to such a network as the Internet. The computer system may be a personal computer, a work station, a mainframe computer, and so forth.

Furthermore, there is no special restriction to apply to the environment under which the program to be described in an embodiment of the present invention is to be executed. Although the program executes under the EJB (Enterprise Java Beans) in the following embodiments, the program may be executed in such a web server as the Java Servelet, Apatch, and so forth, as well as in other middleware, Unix, Windows, and any other operating systems (OS). There is also no restriction to apply to the programming language. However, the programming language is preferably an object-oriented one. In the following description, Java or Jaba2 is used as a programming language. The programming language may also be replaced with any of C++, objective-C, smalltalk, C, and so forth.

Figure 1:
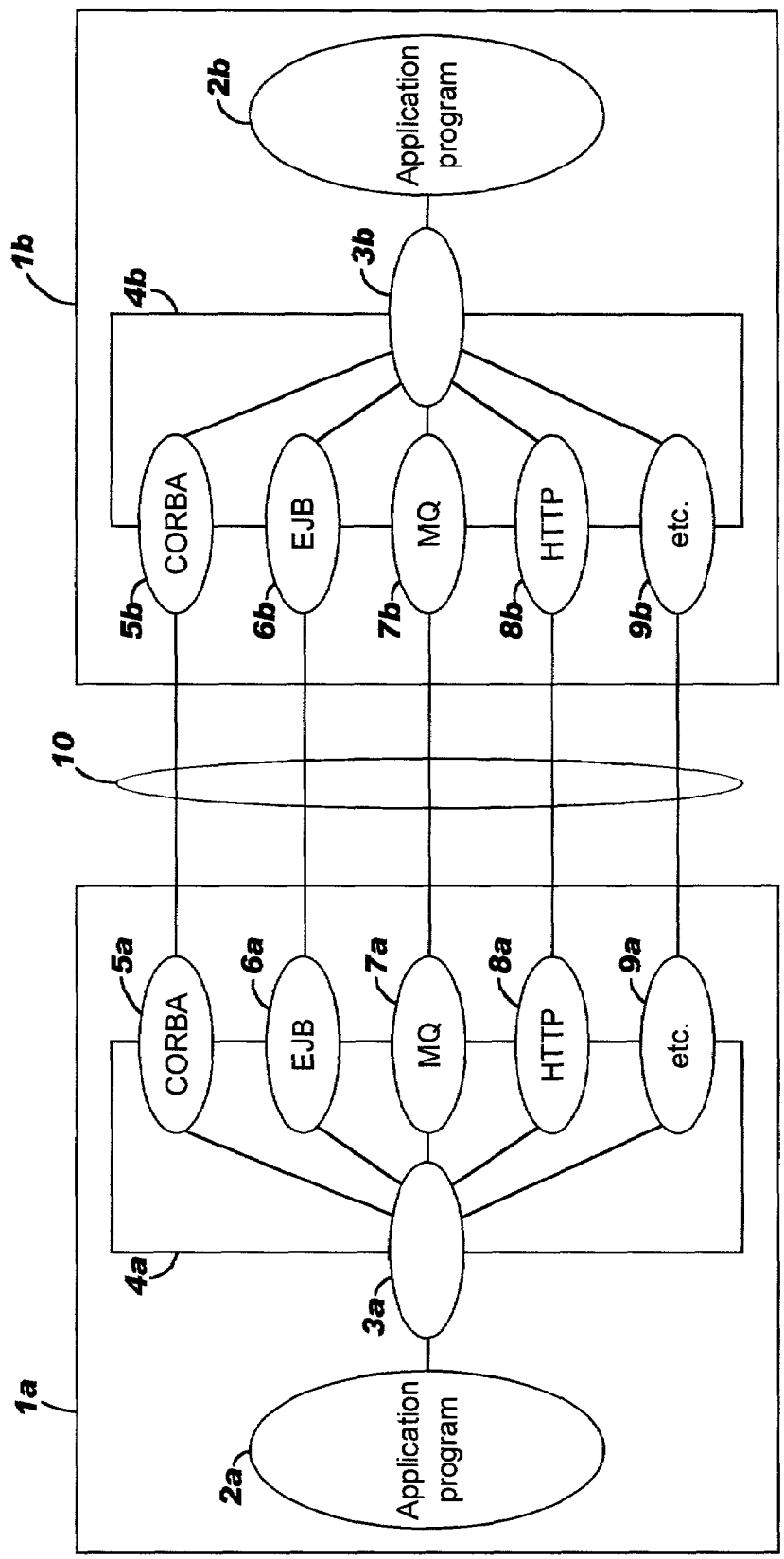
FIG. 1 is an explanatory concept chart of a data communication system according to an embodiment of the present invention.

FIG. 1 is an explanatory view of the concept of a data communication system in a first embodiment of the present invention. The data communication system in this embodiment communicates data between application programs 2a and 2b that run in the systems 1a and 1b. Each of the systems 1a and 1b is provided with a data communication program 3a/3b; an interface program 4a/4b; and an implementation program for each protocol 5a to 9a/5b to 9b.

When the application program 2a is used to send data, a target protocol is specified as a property and sent to the data communication program 3a. The procedure for sending data to the data communication program 3a is simple and common among protocols. Consequently, the programmer can develop or maintain application programs regardless of the specifications or procedure for each protocol.

The data communication program 3a implements an implementation program (any of 5a to 9a) corresponding to a specified protocol with use of the interface program 4a. The program 3a then sends the received communication data to the system 1b with use of the implemented program (any of 5a to 9a). In FIG. 1, CORBA (IIOP), EJB (RMI over IIOP), MQ, and HTTP are shown as such implementation programs. The implementation programs are not limited only to them, however. For example, SOAP and any other protocols may be used, of course. The implementation program must be prepared in accordance with the target protocol.

The system 1b executes predetermined processings and returns the results to the system 1a in the same procedure. The system 1a receives the results as return values. Processing in the system 1b is not always required; the system 1b may return confirmation messages of receiving data without further processing.

Communication data is sent/received with use of each protocol via the communication line 10. Although a communication line is shown for each protocol in FIG. 1, it is a conceptual or logical one. Actually, a communication line is not necessarily provided for every protocol, of course.

Figure 2:
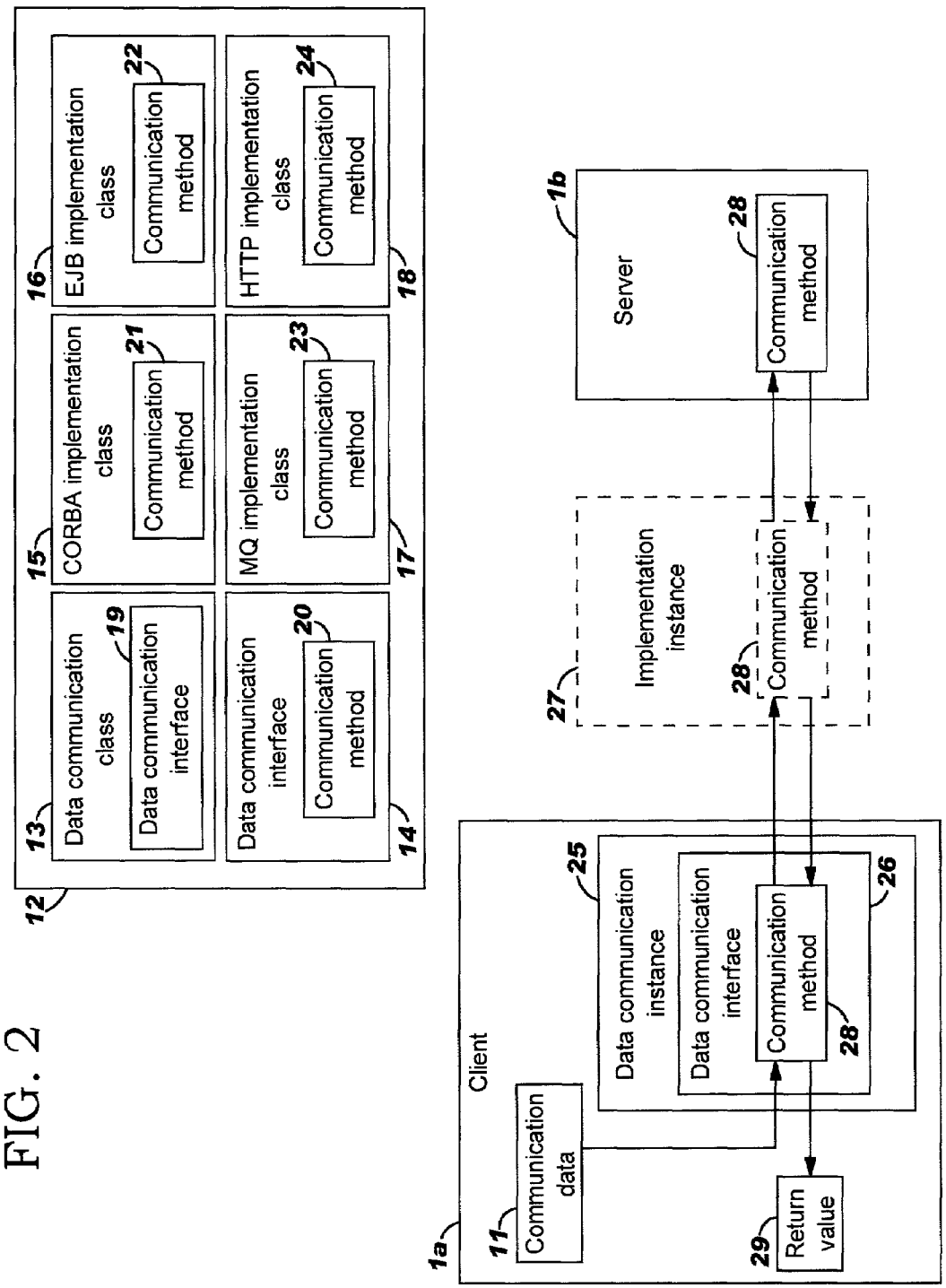
FIG. 2 is a functional block diagram of the data communication system according to an embodiment of the present invention.

FIG. 2 is a functional block diagram of the data communication system in the first embodiment of the present invention. The data communication system in this embodiment is also provided with a data communication program package 12. While a program execution environment or a utility program, a program library, and so forth may be required so as to execute the data communication program in this embodiment, they are omitted in FIG. 2. The Java program to be described below needs such an execution environment as JVM, and so forth, as well as such a Java API as the core API, the standard expanded API, and so forth.

The data communication program package 12 includes a data communication class 13; a data communication interface 14; a CORBA implementation class 15; an EJB implementation class 16; an MQ implementation class 17; and an HTTP implementation class 18.

The data communication class 13 is initialized in a subject application program. The instance is a class of the Java API (Java Application Program Interface) used as a communication interface. The data communication class 13 includes a data communication interface 19 (instance) generated in its initialization. The initialization of the data communication class 13 also generates an instance of a communication implementation class corresponding to a protocol specified for the property passed as an argument in the initialization. This communication implementation class is any of the CORBA implementation class 15, the EJB implementation class 16, the MQ implementation class 17, and the HTTP implementation class 18. The instance of the generated communication implementation class is cast to the above-described data communication interface 19 (instance). Consequently, the data communication class 13, when it is initialized, generates an instance corresponding to the protocol in use.

The data communication interface 14 is a Java interface, which, when it is initialized in an application program, takes over the communication method 20 described in the application program. As described above, because the communication implementation class instance is cast to the interface in the instance of the data communication class 13, the data communication interface 14 must be implemented in the subject application program so that the communication method described in this interface can be used.

Each of the CORBA implementation class 15, the EJB implementation class 16, the MQ implementation class 17, and the HTTP implementation class 18 is a Java class used for the communication in accordance with each protocol. In each implementation class, a communication method (any of 21 to 24) is described so as to send/receive communication data in a format corresponding to each protocol.

Each of the implementation classes 15 to 18 of the data communication class 13, the data communication interface 14, the CORBA, the EJB, and the HTTP will be shown as a Java program code. The class name of the data communication class 13 is "communicationComponent" and the interface name of the data communication interface is "CommunicationInterface". The class names of the CORBA, EJB, MQ, and HTTP implementation classes 15 to 18 are "CommunicationCORBAImplementation", "CommunicationEJBImplementation", "CommunicationMQImplementation", and "CommunicationHTTPImplementation". The communication method name is "call".

The following codes denote the main portions of the above implementation classes; they do not assure perfect execution of programs. In every code shown below, each number enclosed by parentheses at the initial position of each line denotes a line number.

"CommunicationComponent" contents (data communication class 13)

```
(1.01)   CommunicationInterface commi;
(1.02)   init(Property prop) {
(1.03)       if(prop.get("Mode")=="CORBA")
(1.04)           java.lang.Class cls =
(1.05)               Class.forName("ComunicationCORBAImplementation.class");
(1.06)       if(prop.get("Mode")=="EJB")
(1.07)           java.lang.Class cls =
(1.08)               Class.forName("ComunicationEJBImplementation.class");
(1.09)       if(prop.get("Mode")=="MQ")
(1.10)           java.lang.Class cls =
(1.11)               Class.forName("ComunicationMQImplementation.class");
(1.12)       if(prop.get("Mode")=="HTTP")
(1.13)           java.lang.Class cls =
(1.14)               Class.forName("ComunicationHTTPImplementation.class");
(1.15)       commi = (CommunicationInterface) cls.newInstance( );
(1.16)   }
(1.17)   Parser call(String target, Parser parser) {
(1.18)       Parser ret_parser = commi.call(target, parser);
(1.19)       return ret_parser;
(1.20)   }
```

In line number (1.01), an instance "commi" of the interface "CommunicationInterface" is generated. This "CommunicationInterface" is equivalent to the data communication interface 19. In line numbers (1.02) to (1.16), an implementation class corresponding to the property "prop" is selected and the implementation class instance is cast to the interface instance "commi". In line numbers (1.17) to (1.20), the call method in the "CommunicationInterface" instance is described. Concretely, when the "CommunicationComponent" call method is called, the call method of the implementation instance such as "CommunicationCORBAImplementation", cast to the "commi" interface is called.

"CommunicationInterface" contents (data communication interface 14)

```
(2.01)       public interface CommunicationInterface {
(2.02)           Parser call (String target, Parser parser);
(2.03)       }
```

"CommunicationInterface" describes both "parser" and "call" method that can be taken over from an application program to another. This call method is equivalent to the communication method 20. Contents of the call method (communication method 21) in "CommunicationCORBAImplementation.class" are:

```
(3.01)   java.util.Properties props = new java.util.Properties( );
(3.02)   props.put ("org.omg.CORBA.ORBClass", "com.ibm.CORBA.iiop.ORB");
(3.03)   ORB orb = (com.ibm.CORBA.iiop.ORB) ORB.init
(3.04)                       (new String[0], props);
(3.05)   obj = orb.resolve_initial_references ("NameService");
(3.06)   iExtendedNC = NamingContextHelper.narrow (obj);
(3.07)   obj=iExtendedNC.resolve_with_string("CommunicationCORBA");
(3.08)   CommunicationCORBA comm = CommunicationCORBAHelper.narrow( obj );
(3.09)   parser = comm.call ("targetMethod", parser.getString( ),
(3.10)                       parser.getBinary( ));
```

In line numbers (3.01) to (3.04), the "CORBA ORB" (communication part) is initialized. Then, a name service is obtained in line numbers (3.05) to (3.06). In line numbers (3.07) to (3.08), a server object is searched and obtained with use of the name service. In line numbers (3.09) to (3.10), the CORBA server object call method is called.

Contents of the call method (communication method 22) in "CommunicationEJBImplementation.class" are:

```
(4.01)   InitialContext context = new InitialContext( );
(4.02)   java.lang.Object obj = init_context.lookup
                           ("CommunicationEJB");
(4.03)   CommunicationEJBHome cHome = (CommunicationEJBHome)
(4.04)                       javax.rmi.PortableRemoteObject.narrow
(4.05)                       (obj, CommunicationEJBHome.class );
(4.06)   CommunicationEJB comm = cHome.create( );
(4.07)   parser = comm.call ("targetMethod",
(4.08)                       parser.getString( ),
                           parser.getBinary( ));
```

In line number (4.01), the EJB is initialized. Then, the home of a server EJB object is searched and obtained in the line numbers (4.02) to (4.06). After this, the call method of the EJB server object is called in line numbers (4.07) to (4.08).

Contents of the call method (communication method 23) in "CommunicationMQImplementation.class" are:

```
(5.01)   iMq_msg = new MQMessage( );
(5.02)   iMq_msg.correlationId = getUniqueId( );
(5.03)   iQMgr = getQueueManager( );
(5.04)   iQueue_manager = new MQQueueManager (iQMgr);
(5.05)   iPut_queue = iQueue_manager.accessQueue (iPut_qName,
(5.06)                      (int) iQopen_optioin, null, null, null);
(5.07)   iGet_queue = iQueue_manager.accessQueue (iGet_qName,
(5.08)                      (int) iQopen_optioin, null, null, null);
(5.09)   iMq_msg.write(parser.getString( ) + parser.getBinary( ));
(5.10)   iPut_queue.put(iMq_msg, iPut_optioin);
(5.11)   iGet_queue.get(iMq_msg, iGet_option, iMaxMsg_size);
(5.12)   byte retByte[ ] = new byte[iMq_msg.getDataLength( )];
(5.13)   iMq_msg.readFully(retByte);
(5.14)   parser.restore(retByte)
```

In line numbers (5.01) to (5.08), the MQ is initialized. In line number (5.01), the message is initialized. In line number (5.02), a unique ID is obtained. In line number (5.03), a queue manager is obtained. In line number (5.04), an MQ manager is obtained. In line numbers (5.05) to (5.06), a PUT queue is obtained. In line numbers (5.07) to (5.08), a GET queue is obtained. In line numbers (5.09) to (5.14), a message is sent/received (PUT/GET). In line number (5.09), a message is created. In the line number (5.10), the message is sent (PUT). In line number (5.11), data is received (GET). In the line number (5.12), return data is restored. In line number (5.13), return data is obtained. In line number (5.14), return data is restored in a parser.

Contents of the call method (communication method 24) in "CommunicationHTMLImplementation.class" are:

```
(6.01)   URLConnection urlConnection = url.openConnection( );
(6.02)   urLConnection.setDoOutput (true); // POST
(6.03)   BufferedWirter bwn =
(6.04)   new BufferedWriter(
(6.05)     new OutputStreamWriter(urlConnection.getOutputStream( )) );
(6.06)   bwn.write(parser.getString( ) +parser.getEncodedBinary( ));
(6.07)   bwn.close( );
(6.08)   BufferedReader brn = new BufferedReader(
(6.09)   new InputStreamReader(urlConnection.getInputStream( )) );
(6.10)   String line = brn.readLine( );
(6.11)   brn.close( );
(6.12)   parser.restoreEncoded(line);
```

In line numbers (6.01) to (6.02), the connection is opened. In line numbers (6.03) to (6.07), data is written. In line numbers (6.08) to (6.12), data is read.

Next, a description will be made for a data communication method for sending data from an application program in a system in which the program package 12 is installed as described above. In FIG. 2, communication data 11 described in a client system 1a is communicated by a client application program. A data communication instance 25 is generated when a data communication class 13 is initialized. The data communication instance 25 includes a data communication interface 26. The data communication interface 26 (equivalent to "commi" in the above program code) generated in the initialization includes a communication method 28 (equivalent to "call" in the "commi" in the above program code) as described above. Because the instance of the implementation of any of the CORBA, the EJB, the MQ, and the HTTP is cast to the data communication interface 26, the data communication interface 26, after the initialization, is assumed as the implementation instance 27 of any of the CORBA, the EJB, the MQ, and the HTTP. The implementation instance 27 includes each implementation communication method 28 (any of 21 to 24). The implementation instance 27 enables this communication method 28 to be linked to the communication method 28 of the server system 1b, so that calling the communication method 28 (equivalent to the call method in the above program code) from an application program means communication with the server system 1b. Hereinafter, a description will be made for the data communication program code in an application program in the system in this embodiment of the present invention.

```
(7.01)   CommunicationComponent cc = new CommunicationComponent(property);
(7.02)   String return = cc.call (String target, Parser parser);
```

The system in this embodiment makes it easier to realize data communication. Thus, the programmer is required just to substitute a protocol for the property, communication data for the parser, and the other end of communication for the target so as to describe the command. The parser can include both character string data and binary data.

Figure 3:
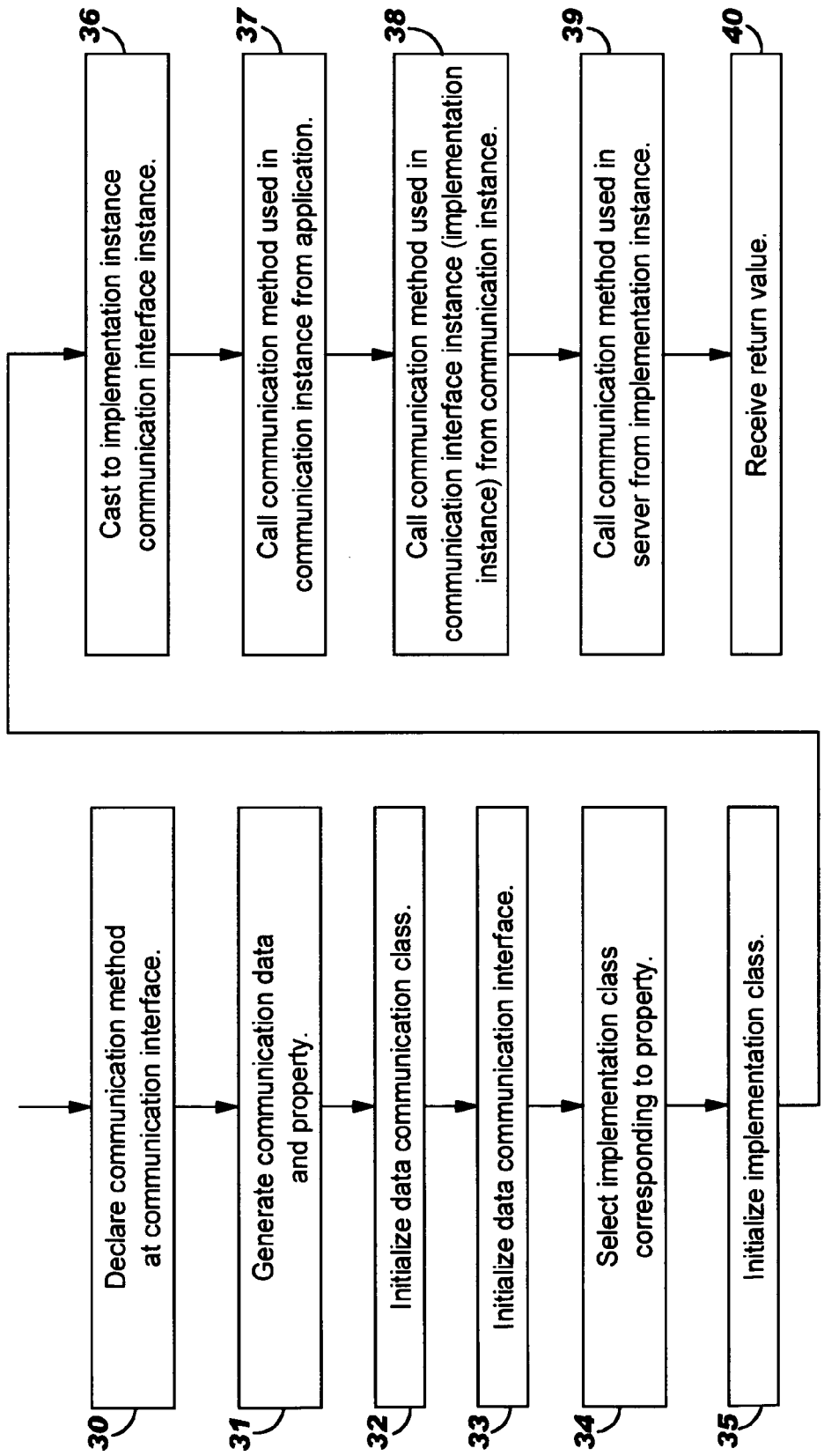
FIG 3 is a flowchart for the processings of a data communication method according to an embodiment of the present invention.

Next, a description will be made for processings executed by the communication program in detail with reference to the flowchart shown in FIG. 3. The flowchart shown in FIG. 3 is for the data communication method in the first embodiment of the present invention. Upon entry, it is premised in the flowchart that a data communication interface 14 is implemented in an application program in the system 1a and a communication method (call) is usable (step 30).

Then, both communication data and property are generated in the application program used to send data (step 31). The communication data is substituted for "parser" and the property is substituted for "property" respectively. After this, an instance cc of a data communication class (CommunicationComponent) is generated and an argument "property" is substituted. Then, the "CommunicationComponent" class is initialized. The value obtained after the initialization is substituted for the instance cc (step 32, line number 7.01).

Due to the initialization of this (CommunicationComponent) class, an instance "commi" is generated for the data communication interface (CommunicationInterface) (in step 33, line number 1.01). Then, the mode in the property is checked. When the mode is CORBA, CommunicationCORBAImplementation.class is selected. When the mode is EJB, CommunicationEJBImplementation.class is selected. When the mode is MQ, CommunicationMQImplementation.class is selected. And, when the mode is HTTP, CommunicationHTTPImplementation.class is selected (step 34, line numbers 1.03 to 1.14). After this, an instance is generated for the selected implementation class (step 35). The generated instance is cast to "commi" (step 36, line number 1.15).

When the call method of the cc instance is called from an application program (step 38, line number 7.02), the "call" method of the server is called (step 39) via the "commi" interface and each implementation instance, thereby the communication data "parser" is passed to the server.

Executing a predetermined processing on the basis of the received data, the server returns the return value of the "call" method to the client as in the aforementioned way. The client receives the return value of the "call" method (step 40, line number 7.02). The return value is substituted for "return".

As described above, according to the data communication method and the data communication system of the present invention, it is possible to reduce the programmer load in development or maintenance of application programs. Consequently, it is possible to improve the efficiency of program development.

In the above first embodiment, there is no special restriction to apply to the communication data 11 generated by each application program. In this second embodiment, however, XML-formatted data is used as communication data so as to describe character string data. Communication data used in the data communication system in this second embodiment is XML-formatted character strings or XML-formatted character strings and binary data.

When describing data with an XML character string, for example, when describing name data, the data is enclosed by a tag for describing the data (Name tag in this example) and its terminating tag as shown below.

(8.01)     <Name>Tokkyo Taro</Name>

In this case, the whole data is handled as a character string.

When the above (8.01) is applied in the first embodiment, it will be described as follows.

(8.02)   String xml_data = String ("<Name>Tokkyo Taro</Name>");
(8.03)   CommunicationComponent cc = new CommunicationComponent(property);
(8.04)   String return = cc.call (String target, String xml_data);

Because communication data is structured as XML data in this way, data contents in each application program can be known. Because XML data is read easily, it is easy to understand the data contents. In addition, because XML data can be generalized, only necessary data is selected and used in the subject application program. Consequently, for example, even when the data format is changed at the other end of communication, it is required to modify only the application program that uses the data so as to meet the change of the data format; there is no need to change the communication interface. The advantage will be effective especially for application programs expected to cope with changes of data contents. For example, the advantage will be more effective for B2B transactions between corporations. In addition, because the XML is used to describe communication data, it is easy to process data in the subject application program after receiving the data. And, because the XML validity can be checked with a parser, both reliability and usability of communication data are improved. Development of application programs also becomes easy. In other words, the use of the XML for communication data makes it easy to build flexible application systems.

A description has been given for XML data used as communication data in the second embodiment. In a third embodiment, however, a description will be given for a method for reducing the disadvantage for handing XML character strings. The XML validity can be checked with use of a parser or an XML processor. On the other hand, when the overhead is increased by such a validity check, it would be difficult to use XML character strings for mission critical processings. This is why a description is given for a method of reducing the validity check load in this third embodiment.

For example, when array data is represented as an array consisting of 3×2 character strings in accordance with the rules of the RPC communication that uses such the XML as SOAP, the data may be described as follows.

(9.01)   <SOAP-ENC:Array SOAP-ENC:ArrayType="xsd:string[3,2]">
(9.02)       <item>row1col1</item><item>row1col2</item>
(9.03)       <item>row2col1</item><item>row2col2</item>
(9.04)       <item>row3col1</item><item>row3col2</item>
(9.05)   </SOAP-ENC:Array>

In this description, "row1col1" denotes an element set in the row 1 and the column 1. Other elements are also set in the same way. Concretely, each element in an array is enclosed by item tags. However, when the same structured data is repeated many times this way, the parser load for the grammar analysis increases. This has been noticed by the present inventor, who has therefore employed the following data structure, which is similar to that denoted in (9.01) to (9.05).

(9.06)   <Arraydata ARRAY_CONTENTS="true">
(9.07)      row1col1, row1col2, row2col1, row2col2, row3col1, row3col2
(9.08)   </Arraydata>

Tags are omitted and both starting and terminating tags are replaced with commas at each portion where the same structured data is repeated. In other words, each position between elements in an array is replaced with a comma so as to reduce the number of tags while the feature of the data structure is kept as is. Consequently, the parser's validity check load can be reduced and the processings for XML character strings used as communication data can be speeded up more. Especially, this advantage will be significant for validity checks of XML documents. The comma is just an example; it may be replaced with any other separator, of course. This idea may also apply to one-dimensional array data, map data, and so forth, as well as communication data in which the same structured data is described iteratively and tagged.

Next, a description will be given for the processings of the system in the first embodiment in which the above-described array or map data is used as communication data for XML documents. First, an example of array character data will be shown below.

```
(10.01)   String cols[ ] = new String[3];
(10.02)   cols[0] = "Name";
(10.03)   cols[1] = "Adress";
(10.04)   cols[2] = "Phone";
(10.05)   TableModel table = new TableModel(cols);
(10.06)   table.addValue("name", "fname lname");
(10.07)   table.addValue("Adress", "Country City Street");
(10.08)   table.addValue("Phone", "03-3000-3000");
(10.09)   String xml_data = table.toString( );
(10.03)   CommunicationComponent cc;
(10.04)       cc = new CommunicationComponent(property);
(10.05)   String return = cc.call(String target, String xml_data);
```

In this case, the generated communication data xml_data (character string data) is processed as follows.

```
<Table1>fname lname, Country City Street, 03-3000-3000</Table1>
```

In the same way, map type character data is processed as follows.

```
(11.01)   MapModel map = new MapModel( );
(11.02)   map.put("name", "fname lname");
(11.03)   map.put("Adress", "Country City Street");
(11.04)   map.put("Phone", "03-3000-3000");
(11.05)   String xml_data = map.toString( );
(11.06)   CommunicationComponent cc;
(11.07)       cc = new CommunicationComponent(property);
(11.08)   String return = cc.call(String target, String xml_data);
```

In this case, the generated communication data xml_data (character string data) is processed as follows.

```
<Map1>Name=fname  lname,  Address=Country  City  Street, Phone=03-3000-3000</Map>
```

In this case, although an "=" (equal) is used to connect a map element to data connected to the map element, the "="may be replaced with any other connection character, of course.

As described above, this third embodiment makes it possible to generate XML character strings that require fewer tags by simplifying the same structured data within a range so as not to damage the feature of the data structure in each XML document in which the same structured data is repeated. Consequently, data communication can be speeded up. This third embodiment will therefore be effective for XML validity checks to be made by a parser. Although the flexibility is degraded slightly, since the XML document is simplified just like in this third embodiment, the employment of the data communication method in this third embodiment will be effective in the engineering field where such the iterative data structure is used frequently and a high communication speed is required.

In the above second and third embodiments, character strings are used as communication data. In a fourth embodiment, however, binary data is included in communication data.

When binary data is included in communication data, the binary data "byte[]" and both starting and ending positions of each element in this binary data are included as XML character strings in the subject communication data. When binary data "Photo1" is set in the position between the 0th byte and the 100th byte of the binary data "byte[]" and binary data "Image2" is set in a section between the 101st byte and the 200th byte, the XML character string can be generated as follows.

(12.01) <Photo1 >0,100</Photo1><Image2 >101,200</Image2>

The above idea is realized as follows in the first embodiment.

```
(12.02)   BinaryModel binary = new BinaryModel( );
(12.03)   binary.put("Photo1", "byte[ ]);
(12.04)   binary.put("Image2", "byte[ ]);
(12.05)   String xml = binary.toString( );
(12.06)   CommunicationComponent cc;
(12.07)       cc = new CommunicationComponent(property);
(12.08)   String return = cc.call(String target, xml, binary);
```

Both character string data and binary data are included in the communication data "parser" in the first embodiment. To make both data match, (12.09) to (12.11) may be processed as follows.

```
(12.09)   Parser parser;
(12.10)       parser.putString(xml);
(12.11)       parser.putBinary(binary);
```

Then, (12.08) may be processed as follows.

(12.12) String return=cc.call(String target, Parser parser);

According to this fourth embodiment, binary data can be used as communication data as is. Consequently, for example, there is no need to encode/decode characters to/from binary data. The communication is thus speeded up. Even when binary data is communicated as is, both starting and ending positions of each element (Photo1, Image2) in binary data are identified concurrently as XML character strings. Thus, no problem arises.

A fifth embodiment includes a method for simplifying XML documents, thereby speeding up data communication. In this fifth embodiment, an original parser is used to generate simplified XML character strings. The example codes are as shown below.

```
(13.01)   OrijinalParser parser = new OrijinalParser( );
(13.02)   parser.put("Table1", table);
(13.03)   parser.put("Map1", map);
(13.04)   parser.put("Photo1", byte[ ]);
(13.05)   parser.put("Image2", byte[ ]);
(13.06)   CommnunicationComponent cc=new
          CommunicationComponent(property);
(13.07)   String return = cc.call(String target, Parser parser);
(13.08)   parser.restore(return);
```

The "Originalparser" calls the "put" method, thereby enclosing the second argument data with index character tags specified for the first argument. Then, the "Originalparser" adds the tagged characters enclosed by the second argument data to "parser". This means that each element of the subject XML document generated by this "Originalparser" is 1 in depth and no slave element is generated from the element.

The "table", "map", and "byte[]" in (13.02) to (13.05) are the same as those in the third and fourth embodiments. And, a return value is substituted for "parser" so as to analyze the return document, then each data is taken out in (13.08).

The character strings of the data generated with the above codes will become as shown below.

---

<Table1>fname 1name, country City Street, 03-3000-3000</Table1><Map1>Name=fname lname, Adress=Coutry City Street, Phone=03-3000-3000</Map><Poto1>0, 100</Poto1><Image2>101,200</Image2>

---

Concretely, unlike ordinary XML documents, this data is not structured so that another data structure exists in an array and some hierarchical layers are nested. More concretely, a simple element is enclosed by tags and such a data structure is repeated simply.

While the parser in this fifth embodiment cannot generate general and flexible XML documents, the parser can generate XML character strings that are useful enough to represent ordinary business data. In other words, the original parser in this fifth embodiment can generate simplified XML documents and handle maintenance-easy XML documents in business data communication with no problem when the data communication method in the above embodiments including the first one is employed. In addition, because XML documents generated by the parser in this fifth embodiment are structured simply, the parser's load for XML document validity checks is low, thereby enabling fast data communication.

According to the present invention, it is possible to communicate data between components with use of a single procedure regardless of the matching among protocols used in the communication when programming or maintaining programs. In addition, the present invention can provide a communication interface technique and a communication data structure that can cope with changes of data specifications, and so forth with the minimum maintenance load. Furthermore, when XML character strings are included in communication data, the overhead of data transfer can be reduced. And, when communication data is to be checked, the checking load can be reduced.

While preferred forms of the present invention have been described concretely, it is to be understood that modifications will be apparent to those skilled in the art without departing from the spirit of the invention.

We claim:

1. A data communication method, comprising the steps of:
   generating a communication instance by using a property as an argument; wherein a target protocol is specified as a property and the communication instance is generated on at least one computing device;
   calling a communication method from said communication instance by using communication data as an argument and the communication method is called on the at least one computing device, and
   communicating the data in accordance with the protocol specified for said property, the communication data including a character string described in an XML format;
   wherein said communication instance is generated for a communication implementation class selected from a plurality of communication implementation classes prepared beforehand for each respective protocol in accordance with the protocol specified for said property.

2. The data communication method according to claim 1, wherein said protocol is selected from the group consisting of CORBA/IIOP, RMI over HOP, HTTP, Message Queuing, and SOAP.

3. The data communication method according to claim 1, wherein said method, when the communication data includes array data, further comprises the steps of:
   delimiting each of a plurality of elements of said array data with a separator so as to generate an array data character string including elements and separators; and
   enclosing said array data character string with an array tag and a terminating tag so as to generate an XML-formatted character string.

4. The data communication method according to claim 1, wherein said method, when the communication data includes map data, further comprises the steps of:
   connecting each element of said map data to mapping data mapped in said element with use of a connection character so as to generate a character string including elements, connection characters, and mapping data;
   delimiting said character string of each element with a separator so as so generate a map data character string including element strings and separators; and
   enclosing said map data character string with a map tag and a terminating tag so as to generate an XML-formatted character string.

5. The data communication method according to claim 1, wherein said method, when the communication data includes binary data, further comprises the steps of:
   generating an element position character string including a character string for denoting a starting position of an element in said binary data, a separator, and a character string for denoting a terminating position of said element; and
   enclosing said element position character string with an element tag and a terminating tag of said element.

6. The data communication method according to claim 1, further comprising the steps of:
   receiving the communication data and an index character string for indexing said communication data;
   enclosing said communication data or its attribute data with a starting tag including said index character string and a terminating tag so as to generate an XML-formatted character string; and
   repeating the steps of receiving and enclosing for a different communication data so as to generate a second XML-formatted character string of said different communication data and adding said character string to said character string.

7. The data communication method according to claim 6, wherein said method, when communication data includes array or map data, further comprises the steps of:
   integrating each element of said array or map data into one element with use of a separator or a connection character; and
   specifying said integrated element as said communication data.

8. The data communication method according to claim 6, wherein said method, when communication data includes binary data, further comprises the steps of:
   integrating a starting position character string for denoting a starting position and a terminating position character string for denoting a terminating position of each element included in said binary data into one element with use of a separator; and
   specifying said integrated element as attribute data of said communication data.

9. A data communication system used between components enabled to receive a property and communication data and communicate said communication data in accordance with a protocol specified for said property, comprising:

a computer device, including:

a communication implementation class prepared for the protocol and describing a communication method for said protocol;

a communication class for selecting said communication implementation class from a plurality of communication implementation classes prepared beforehand for each respective protocol corresponding to the protocol specified for said property so as to generate a communication instance; and a communication means for communicating the data in accordance with the protocol specified for said property, the communication data including a character string described in an XML format.

10. The data communication system according to claim 9, further comprising an interface that takes over said communication method described in said communication instance generated due to the generation of said communication class instance.

11. The data communication system according to claim 9, further comprising:

means for delimiting each of a plurality of elements in array data with a separator so as to generate an array data character string including elements and separators; and means for enclosing said array data character string with an array tag and a terminating tag so as to generate an XML-formatted character string.

12. The data communication system of claim 9, further comprising:

means for generating an element position character string including a character string for denoting a starting position of an element; a separator, and a character string for denoting a terminating position of said element in binary data respectively; and means for enclosing said element position character string with an element tag and a terminating tag of said element.

13. The data communication system according to claim 9, wherein said protocol is selected from the group consisting of CORBA/IIOP, RMl over IIOP, HTTP, Message Queuing, and SOAP.

14. A computer-executable program product stored in a computer-readable medium for enabling a computer to receive a property and communication data so as to communicate said communication data in accordance with a protocol specified for said property, comprising:

a communication implementation class prepared for the protocol and describing a communication method of said protocol; and a communication class for selecting said communication implementation class from a plurality of communication implementation classes prepared beforehand for each respective protocol corresponding to the protocol specified for said property so as to generate a communication instance; and a communication means for communicating the data in accordance with the protocol specified for said property, wherein said communication data includes an XML-formatted character string or binary data and an XML-formatted character string.

15. The program produce according to claim 14, further comprising an interface that takes over a communication method described in a communication instance generated due to the generation of instance of said communication class.

16. The program product according to claim 14, wherein said program product enables said computer to execute:

a function for receiving communication data, and an index character string or binary data and an XML-formatted character string;

a function for enclosing said communication data with a starting tag including said index character string and a terminating tag so as to generate an XML-formatted character string;

a function for repeating said functions for receiving and enclosing for different communication data so as to generate a second XML-formatted character string of said different communication data and adding said second character string to said character string; and a function for specifying said character string as said communication data.

17. The program product according to claim 16, wherein said program product enables said computer to further execute:

a function for integrating each element of array or map data into one element with use of a separator or connection character; and a function for specifying said integrated element as said communication data.

18. The program product according to claim 16, wherein said program product enables said computer to further execute:

a function for denoting a starting position and a terminating position character string for denoting a terminating position of an element included in binary data into one element with use of a separator; and a function for deciding said integrated element as said communication data.

* * * * *